United States Patent
Mullin et al.

(10) Patent No.: US 7,279,958 B1
(45) Date of Patent: Oct. 9, 2007

(54) SYNTHESIZED RESONATION FOR AN EL DRIVER CIRCUIT

(75) Inventors: Jeffrey Doyle Mullin, Wellington, CO (US); Yan Yin, Longmont, CO (US)

(73) Assignee: National Semiconductor Corporation, Santa Clara, CA (US)

( * ) Notice: Subject to any disclaimer, the term of this patent is extended or adjusted under 35 U.S.C. 154(b) by 63 days.

(21) Appl. No.: 11/364,370

(22) Filed: Feb. 27, 2006

(51) Int. Cl.
G05F 1/10 (2006.01)
G05F 1/00 (2006.01)

(52) U.S. Cl. .................. 327/536; 327/537; 327/538; 327/540; 315/307; 315/291; 315/247; 315/224

(58) Field of Classification Search .............. 327/536, 327/537, 538, 540, 588–590; 315/247, 246, 315/291, 307, 297, 224, 225
See application file for complete search history.

(56) References Cited

U.S. PATENT DOCUMENTS

| | | | |
|---|---|---|---|
| 5,977,720 A | 11/1999 | Pace et al. | |
| 6,278,625 B1 * | 8/2001 | Boyd | 363/132 |
| 6,462,485 B1 | 10/2002 | Kimball | |
| 6,515,522 B2 | 2/2003 | Inada et al. | |
| 6,693,387 B2 | 2/2004 | Wood | |
| 2005/0083110 A1 * | 4/2005 | Latham et al. | 327/538 |

OTHER PUBLICATIONS

Patangia et al., "A Switched-Capacitor Inverter for Driving a Highly Capacitive Load," IEEE International Conference on Industrial Technology, pp. 525-529 (2004).
Supertex, Inc., "High Voltage Low Noise Inductorless EL Lamp Driver" HV850 Data Sheet, pp. 1-2 (Jan. 21, 2004).

* cited by examiner

*Primary Examiner*—Tuyet Vo
(74) *Attorney, Agent, or Firm*—Darby & Darby PC; John W. Branch

(57) ABSTRACT

A driver circuit for an electroluminescent (EL) lamp that consumes less power and reduces electromagnetic interference (EMI). Electrical charge is stored during a discharge cycle of an AC signal employed to illuminate an EL lamp, and subsequently reused during the AC signal's charging cycle. The reuse of electrical charge enables the driver circuitry to illuminate the EL lamp while drawing the least amount of power from a power supply, such as a battery. Also, multiple charge pumps can be sequentially/serially turned off during the discharge cycles of the AC signal driving the EL Lamp. By sequentially discharging the EL lamp, a waveform for the AC signal can be synthesized that more closely resembles a relatively symmetrical sinusoidal shape. The relatively symmetrical shape of the synthesized AC waveform serves at least in part to reduce spurious emissions of electromagnetic interference (EMI), audio noise, and improve the efficiency of the driver circuitry.

21 Claims, 7 Drawing Sheets

SYNTHESIZED RESONATION FOR AN EL DRIVER CIRCUIT

FIELD OF THE INVENTION

The invention relates to supplying power to a lamp, and more particularly, to conserving electrical charge from a battery that is used to power an electroluminescent (EL) lamp.

BACKGROUND OF THE INVENTION

EL lamps are commonly used to illuminate the controls and/or displays of many electronic devices. A typical EL lamp is a capacitive element which illuminates when driven by an alternating current (AC) of proper magnitude and frequency.

A typical EL lamp driver circuit generates a peak-to-peak voltage AC waveform of 100 Volts or more with a frequency of a few hundred Hertz to enable an EL lamp to produce sufficient illumination. Specialized inductor based driver circuitry is often used to generate this AC waveform from a direct current (DC) source, such as a battery. However, inductor based driver circuits can produce relatively large amounts of electromagnetic interference (EMI), which is known to adversely effect the operation of many electronic components.

EL lamps are typically used to illuminate the displays of mobile devices such as wireless telephones, media players, personal digital assistants, and notebook computers. To increase the battery life for a mobile device, it is beneficial to drive its EL lamp application using the least amount of electrical power with relatively low EMI.

BRIEF DESCRIPTION OF THE DRAWINGS

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

DETAILED DESCRIPTION OF THE INVENTION

Figure 1:
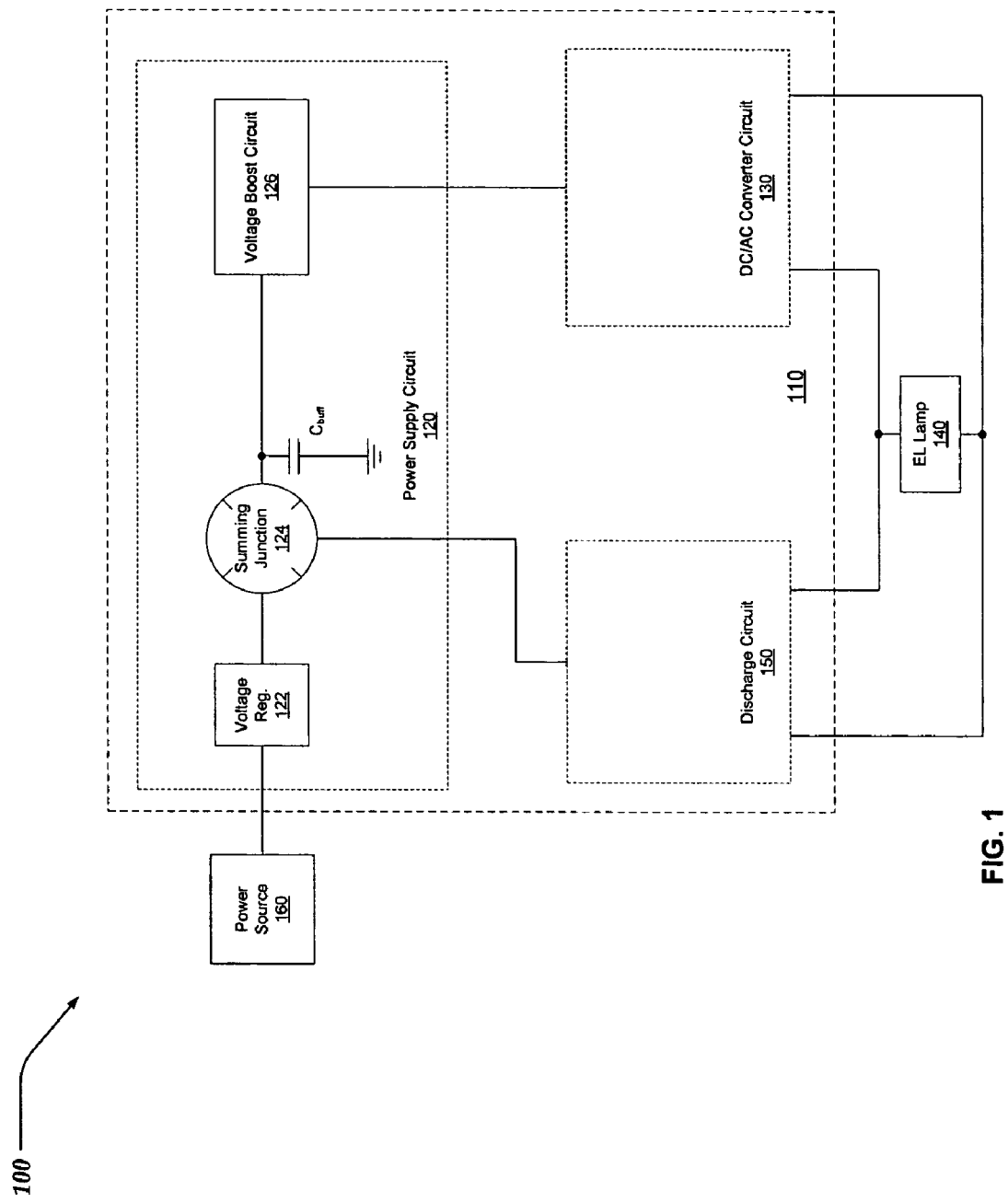
FIG. 1 is a block diagram showing an exemplary system.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. The term "coupled" means at least either a direct electrical connection between the items connected, or an indirect connection through one or more passive or active intermediary devices such as resistor, capacitor, diode, transistor, relay, switch, integrated circuit, and/or the like. The term "circuit" means at least either a single component or a multiplicity of components, either active and/or passive, that are coupled together to provide a desired function. The term "signal" means at least one current, voltage, charge, temperature, data, or other signal. The term "DC" or "direct current" means an electrical signal, whether power, current, voltage, and/or the like, wherein the voltage of the electrical signal is, or is intended to be, substantially held at a steady state value and includes the output of battery cells and DC power supply circuits which are commonly known in the art. The term "AC" or "alternating current" means an electrical signal, whether power, current, voltage, and/or the like, wherein the voltage of the electrical signal is, or is intended to be variable, whether periodic or non-periodic and whether the average voltage with respect to time is positive, negative, or zero. The term "bi-polar" when used in reference to a signal means a signal, the level of which, in relation to time, progresses from one side of a dividing line to the other side of the dividing line. The dividing line may be at a positive, negative, or zero value. Similarly, the terms "positive", "negative", "polar", "polarity", and/or the like when used in reference to a signal level refer to the position of the signal relative to a dividing line.

Briefly stated, the invention is directed to a circuit and a method for an electroluminescent (EL) lamp to consume less power and reduce electromagnetic interference (EMI). Electrical charge is stored during a discharge cycle of an AC signal employed to illuminate an EL lamp, and subsequently reused during the AC signal's charging cycle. The reuse of electrical charge enables the driver circuitry to illuminate the EL lamp while drawing the least amount of power from a power supply, such as a battery. Also, multiple charge pumps can be sequentially/serially turned off during the discharge cycles of the AC signal driving the EL Lamp. By sequentially discharging the EL lamp, a waveform for the AC signal can be synthesized that more closely resembles a relatively symmetrical sinusoidal shape. The relatively symmetrical shape of the synthesized AC waveform serves at least in part to reduce spurious emissions of electromagnetic interference (EMI), audio noise, and improve the efficiency of the driver circuitry.

In another embodiment, the discharge of the EL lamp may be accomplished using a single discharge pulse or may be regulated by a series of regulating resistors and the like. Furthermore, a fade control can be provided for soft starting (fading on), dimming, or fading off the illumination of the EL lamp. To further conserve energy, in response to turning off and/or "fading off" the illumination of an EL lamp, the invention itself can subsequently turn itself off.

FIG. 1 illustrates an embodiment of a system (100). System 100 includes driver circuit 110, EL lamp 140, and power source 160. Driver circuit 110 includes power supply circuit 120, DC/AC converter 130, and discharge circuit 150.

Power supply circuit 120 is configured to receive power from DC power source 160, e.g., a battery, and recycled power from discharge circuit 150. Also, power supply circuit 120 employs voltage boost circuit 126 to combine the received and recycled power to a magnitude suitable to drive EL lamp 140. As shown, source 160 supplies DC power to power supply circuit 120 at an input of voltage regulator 122. Also, voltage regulator 122 is arranged to regulate the output of power source 160 at a predetermine DC voltage, such as five Volts DC. Of course, in other embodiments, other DC voltage levels may be used.

Summing junction 124 combines power from voltage regulator 122 and discharge circuit 150. Summing junction 124 may comprise a hard wired junction or any other circuit or component that enables the combining of energy from multiple power sources. Capacitor $C_{buff}$ buffers the output of summing junction 124 to further stabilize the input of voltage boost circuit 126. It is beneficial to employ a capacitor that is substantially larger than the capacitance value of EL lamp 140. EL lamps generally have a capacitance value on the order of 5 to 10 nF. In one embodiment, capacitor $C_{buff}$ is a 2.2 µF capacitor. Of course, other larger or smaller capacitance values may be used in other embodiments.

Voltage boost circuit 126 boosts the output of summing junction 124 to a voltage level that can drive EL lamp 140. In one embodiment, the output of voltage boost circuit 126 may be approximately 100 volts and is generated by a charge pump circuit. However, virtually any suitable output voltage level may be generated to drive a particular EL lamp at a desired level of illumination.

DC/AC converter circuit 130 is provided to convert the output of voltage boost circuit 126 to an AC waveform. In one embodiment, the AC waveform has a frequency between 200 and 500 Hertz and substantially resembles a sinusoidal waveform. However, virtually any frequency and waveform shape that suitable illumination of EL lamp 140 may be used.

EL lamp 140 is provided to produce the desired illumination. As discussed above, the EL lamps which are commonly known in the art are capacitive devices which produce illumination when provided with AC power of suitable frequency and voltage magnitude. Any EL lamp with suitable requirements and characteristics may be used.

Discharge circuit 150 is configured to remove the excess charge from EL lamp 140 and transfer it to power supply circuit 120 at summing junction 124. In one embodiment, the AC voltage waveform across EL lamp 140 is a periodic bi-polar signal with a positive and a negative stage. Each of the positive and negative stages are divided into a charging stage and a discharge stage. During the positive discharging stage and the negative discharging stage, discharging circuit 150 couples EL lamp 140 to summing junction 124 to transfer excess charge from EL lamp 140 to capacitor $C_{buff}$.

Figure 2A:
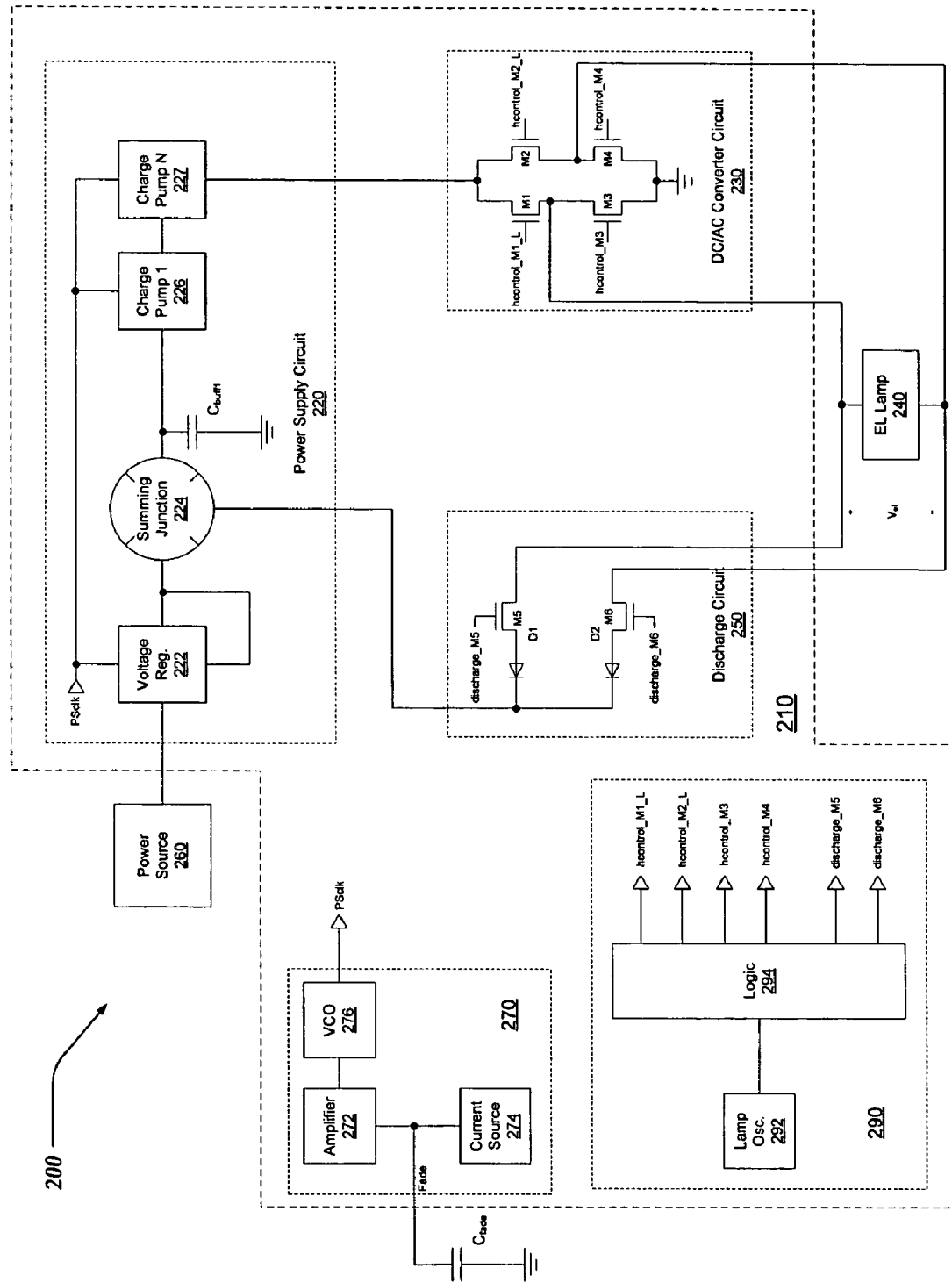
FIG. 2A is a block diagram illustrating another exemplary system.

FIG. 2A illustrates an embodiment of system 200 that includes driver circuit 210, EL lamp 240, power source 260, fade control circuit 270, and waveform control circuit 290. FIG. 2 may be employed as one embodiment of system 100 of FIG. 1. Driver circuit 210 includes power supply circuit 220, DC/AC converter circuit 230, discharge circuit 250, fade control circuit 270, and waveform control circuit 290.

Power supply circuit 220 includes voltage regulator 222, summing junction 224, buffer capacitor $C_{buff1}$, and multiple charge pumps 226, 227. Voltage regulator 222 may include a charge pump, buck converter, boost converter, linear regulator, and/or the like. Voltage regulator 222 may also employ feedback monitoring from its output node to a feedback input to more closely regulate its output.

Input signal PSclk clocks one or more of voltage regulator 222 and/or charge pumps 226, 227. The magnitude of power supply circuit 220 output is adjusted in relation to the frequency of PSclk. Because the EL lamp 240 level of illumination is related, in part, to the magnitude of the driving AC waveform, the frequency of PSclk affects the light output. Additionally, the operational frequency range of PSclk may be constrained such that the operation of one or more of voltage regulator 222 and/or charge pumps 226, 227 is not substantially affected by the change in PSclk. For example, the PSclk operational frequency range and voltage regulator 222 design may be configured to output a relatively fixed voltage level which is substantially unaffected by normal PSclk frequency variations.

Summing junction 224 and capacitor $C_{buff}$ combine the power provided by voltage regulator 222 and discharge circuit 250, and subsequently buffer the provided power for use by charge pumps 226 and 227. Charge pumps 226, 227 are serially connected to sequentially boost the DC voltage and can further include any number and combination of charge pumps, voltage boosting circuits, and/or the like. Charge pumps 226 and 227 may be arranged as doublers, Dickson pumps, and/or the like. In one embodiment, charge pumps 226, 227 may be sequentially arranged as a first doubling charge pump, a multistage Dickson charge pump, and a second doubling charge pump. The inventive combination of multiple charge pumps can be sequentially arranged to output a DC voltage of approximately 100 Volts.

Also, multiple charge pumps 226 and 227 can be sequentially pulsed off during the discharge cycles of the positive and negative stages for an AC waveform driving EL Lamp 240. By discharging EL lamp 240 with multiple discharge pulses, the AC voltage waveform more closely resembles a sinusoidal shape. Additionally, spurious emissions of electromagnetic interference (EMI), and audio noise can be relatively reduced by the substantially sinusoidal shaping. However, the discharge of EL lamp 240 may also be accomplished using a single discharge pulse or may be regulated by a series of regulating resistors and/or the like methods and circuits. Additionally, in one embodiment, discharge circuit 250 can be pulsed on and off instead of, or in combination with the pulsing of the charge pumps.

DC/AC converter circuit 230 includes an H-bridge circuit comprised of transistors M1-M4 which switch under the control of waveform control circuit 290. In short, H-bridge circuit M1-M4 and waveform control circuit 290 creates a periodic bi-polar AC waveform to drive EL lamp 240. In the embodiment illustrated by FIG. 2, M1 and M2 are P-type MOS transistors and M3 and M4 are N-type MOS transistors. However, any suitable switching element may be used to implement DC/AC converter circuit 230. Operation of DC/AC converter circuit 230 is more fully discussed in reference to FIG. 3 and FIG. 4 below. EL lamp 240 may be of any type as discussed above.

Discharge circuit 250 includes discharge transistors M5 and M6 as well as diodes D1 and D2. Transistors M5 and M6 selectively couple the positive and negative terminals, respectively, of EL lamp 240 to summing junction 224 of power supply circuit 220 under the control of waveform control circuit 290. Diodes D1 and D2 allow power to be primarily transferred in one direction, i.e., from EL lamp 240 to power supply circuit 220. Additionally, the output of discharge circuit 250 may be an element of voltage regulator 222 feedback as discussed above.

Fade control circuit 270 provides illumination intensity control via signal PSclk. As discussed above, varying the frequency of PSclk adjusts the magnitude of the voltage output of power supply circuit 220. Fade control circuit 270 includes amplifier 272, current source 274, and VCO 276. Fade control circuit 270 also interfaces with capacitor $C_{fade}$ via interface line fade. $C_{fade}$ may be either an integral part of fade control circuit 270 or an external interfaced component. Current source 274 is operable to modify the charge on $C_{fade}$ and amplifier 272 is configured to sense the voltage level across $C_{fade}$ and amplify it to a suitable level for input by VCO 276. VCO 276 senses amplifier 272 output and generates a waveform with a frequency which is related to the voltage level.

In other embodiments, current source 274 may be a current sink and/or other timing and control methods or circuits may be employed to gradually increase the frequency of PSclk. In one embodiment, fade control circuit 270 is used to "soft start" the illumination of EL lamp 240 by gradually increasing the frequency of PSclk over a known period of time. Furthermore, fade control circuit 270 can be employed to turn off the EL lamp. To further conserve energy, in response to turning off and/or "fading off" the illumination of an EL lamp, the invention itself can turn itself off.

Waveform control circuit 290 generates control signals for DC/AC converter circuit 230 and discharge circuit 250. Lamp oscillator 292 generates a clocking signal for logic 294 to use in generating outputs hcontrol_M1_L, hcontrol_M2_L, hcontrol_M3, hcontrol_M4, discharge_M5, and discharge_M6.

Figure 2B:
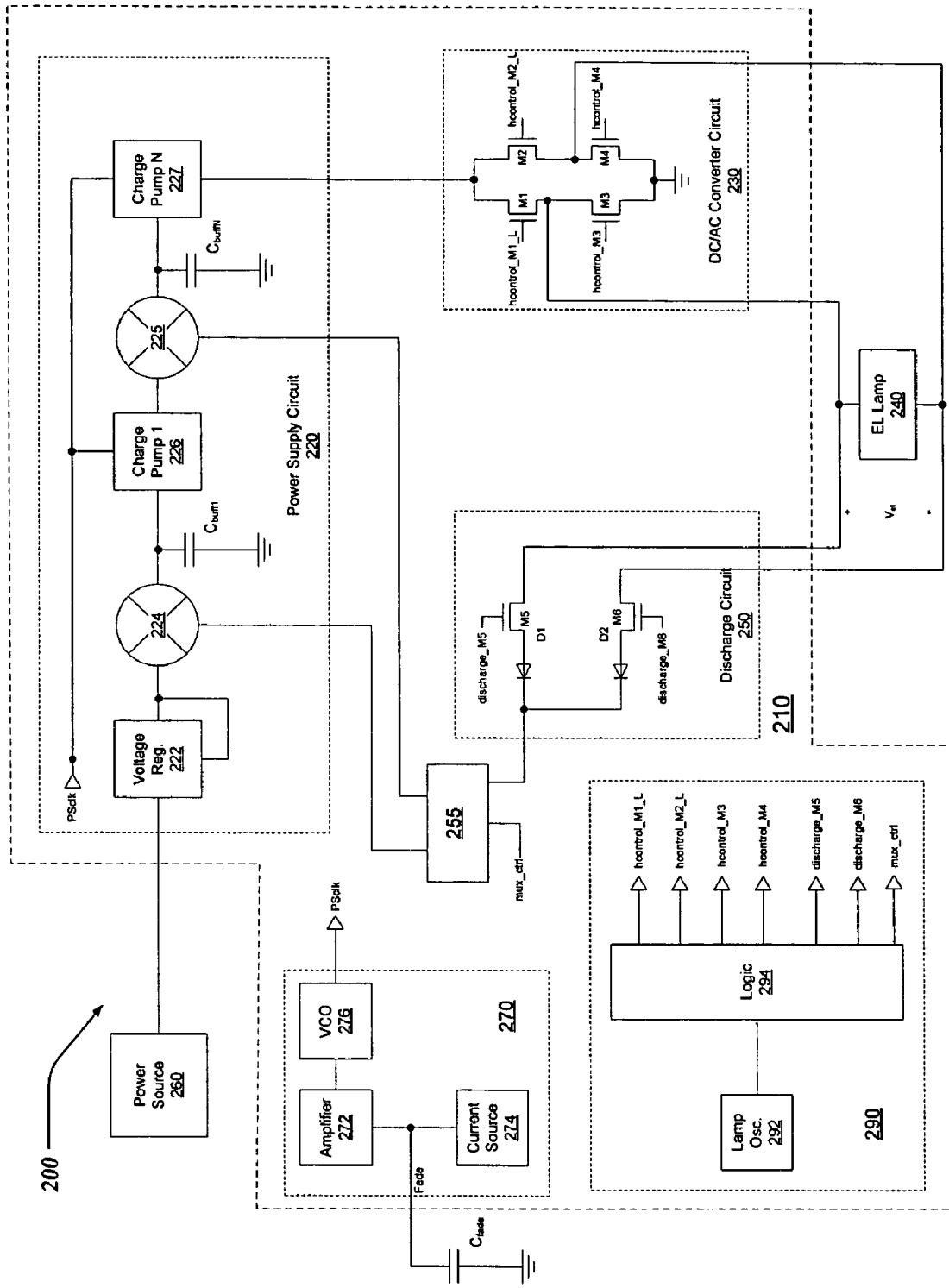
FIG. 2B is a block diagram illustrating a third exemplary system.

FIG. 2B illustrates another embodiment of system 200. As shown in FIG. 2B, system 200 includes additional summing junction 225 and discharge multiplexer 255 to selectively couple the positive and negative terminals, respectively, of EL lamp 240 to different stages of power supply circuit 220. Multiplexer 255 is controlled by waveform control circuit 290 via control line mux_ctrl. By selectively coupling the discharge circuit to different stages of power supply circuit 220, additional power conservation is possible.

The power supply stage which EL lamp 240 is coupled to may be based upon the magnitude of the voltage for EL lamp 240. For example, multiplexer 250 may couple discharge circuit to charge pump N 227 via summing junction 225 when $V_{el}$ is at a relatively large magnitude. However, when $V_{el}$ is at a relatively smaller magnitude, discharge circuit is coupled to summing junction 224 and supplies power to charge pump 1 226. Alternatively, the selective coupling may be accomplished using multiple discharge circuits 250 each having their inputs coupled to EL lamp 240 and respective outputs coupled to different summing junctions 224 or 225.

Figure 3A:
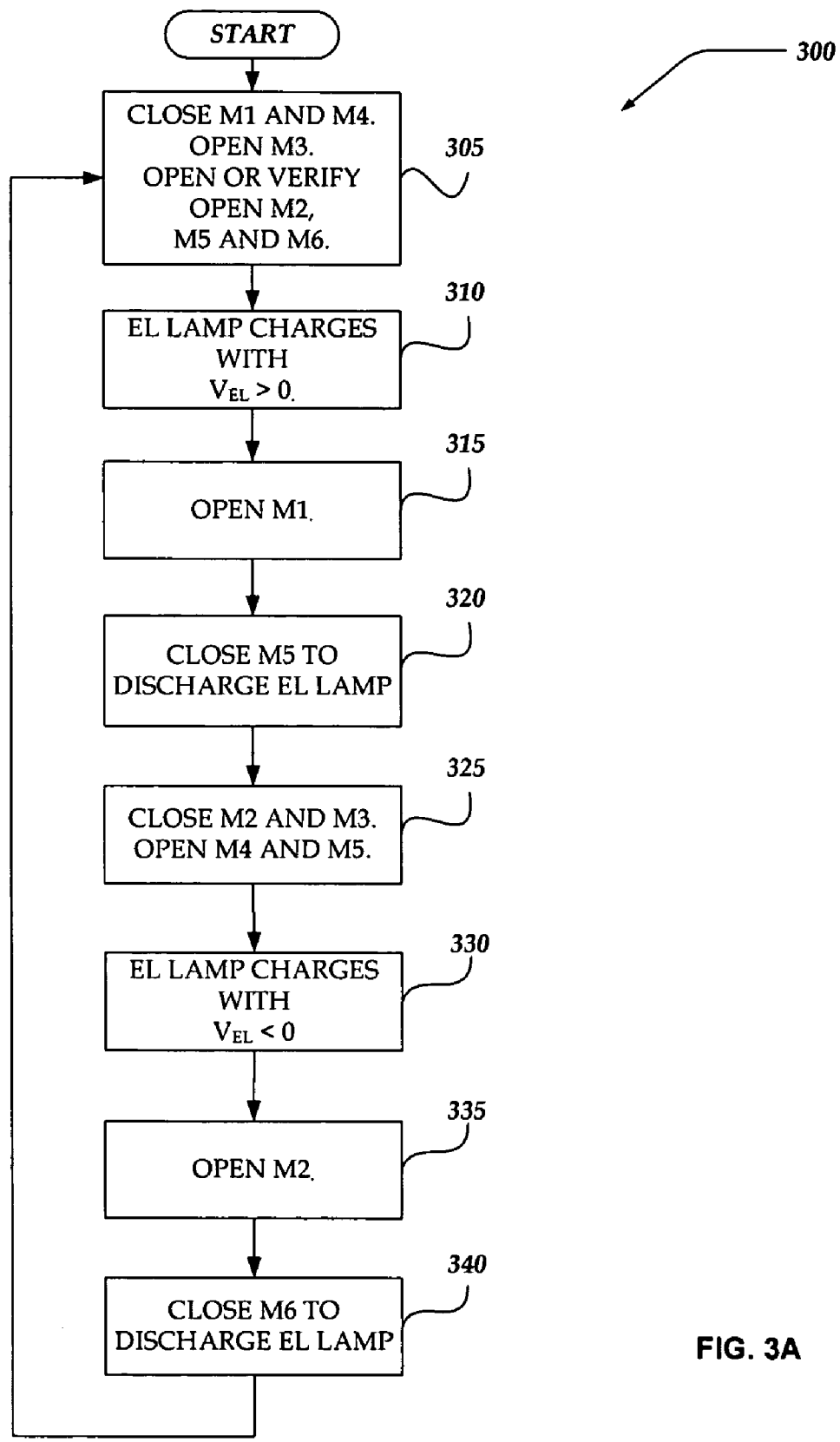
FIG. 3A is a flow chart showing a process for a waveform control algorithm.
Figure 4A:
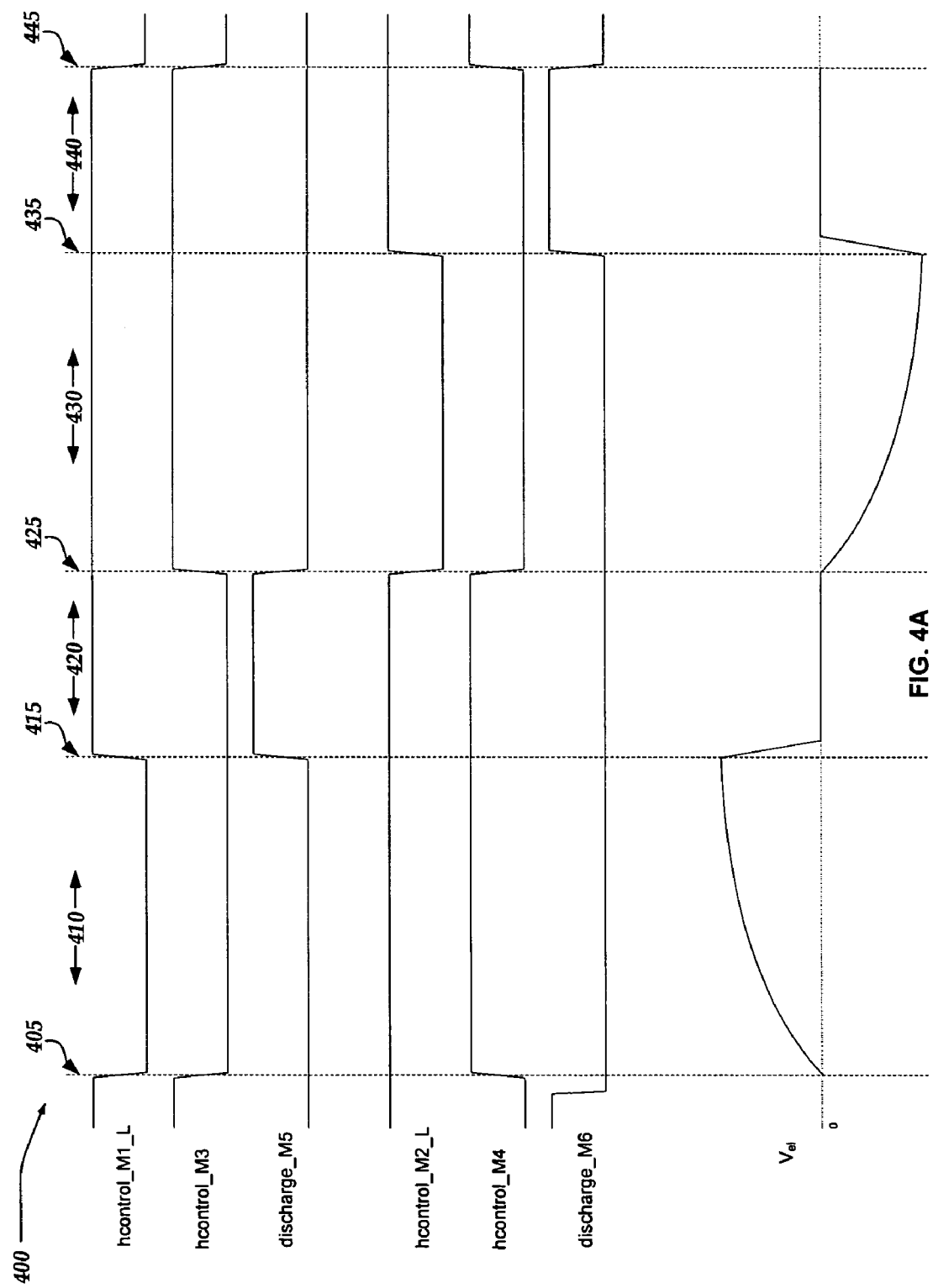
FIG. 4A is a chart that illustrates voltage waveforms showing control voltages and a voltage across an electroluminescent lamp over time.

FIG. 3A is a flow chart and FIG. 4A is a timing diagram that show the operation of an inventive process and the resultant signals generated by waveform control circuit 290 in accordance to the embodiment shown in FIG. 2A. In addition, FIG. 4A also illustrates voltage waveform $V_{el}$ across EL lamp 240 with respect to time.

At block 305/time 405 transistors M1 and M4 are closed by asserting hcontrol_M1_L and hcontrol_M4; transistor M3 is opened by deasserting hcontrol_M3; and transistors M2, M5 and M6 are verified opened or opened by deasserting hcontrol_M2_L, discharge_M5, and discharge_M6. This begins positive charging block 310/time period 410. During block 310/time period 410 EL lamp 240 charges and $V_{el}$ becomes greater than zero. At block 315/time 415, hcontrol_M1_L is deasserted and M1 closes. This ends the positive charging stage 310/410 as shown in FIGS. 3 and 4.

During block 320/period 420 signal discharge_M5 is closed to discharge the positive electrical energy stored on EL lamp 240.

At block 325/time 425 transistors M2 and M3 are closed by asserting hcontrol_M2_L and hcontrol_M3; transistor M4 and M5 are opened by deasserting hcontrol_M4 and hcontrol_M5. This begins positive charging block 330/period 430. During block 330/period 430 EL lamp 240 charges with $V_{el}$ less than zero. At block 335/time 435, hcontrol_M2_L is deasserted and M2 closes. This ends the negative charging stage 330/430 as shown in FIGS. 3 and 4.

At block 340/period 440 signal discharge_M6 is closed to discharge the negative electrical energy stored on EL lamp 240. After completion of negative discharge stage 340/440 the positive charging stage 310/410 is restarted at block 305/time 445.

Figure 3B:
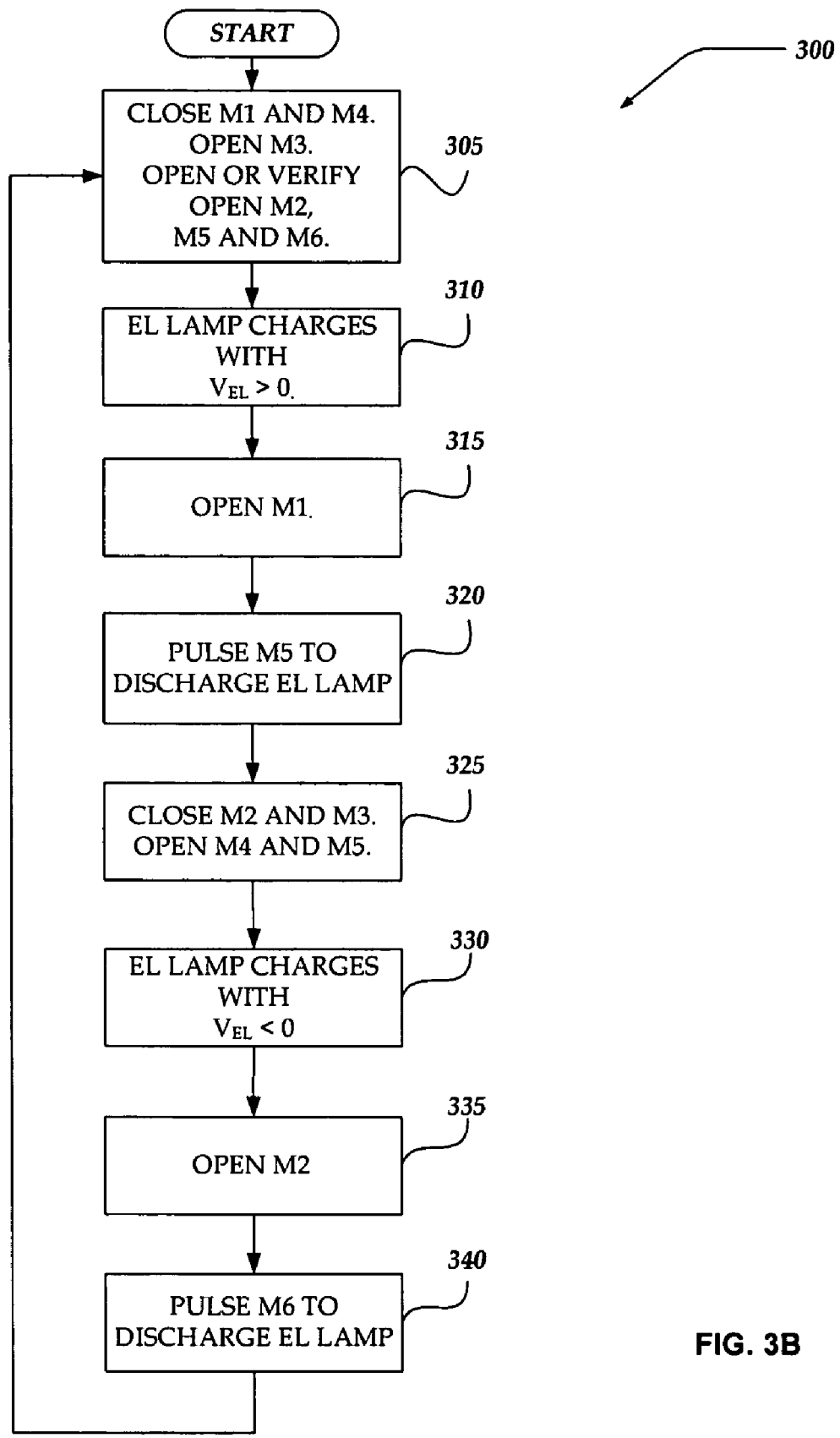
FIG. 3B is another flow chart showing a process for a waveform control algorithm.
Figure 4B:
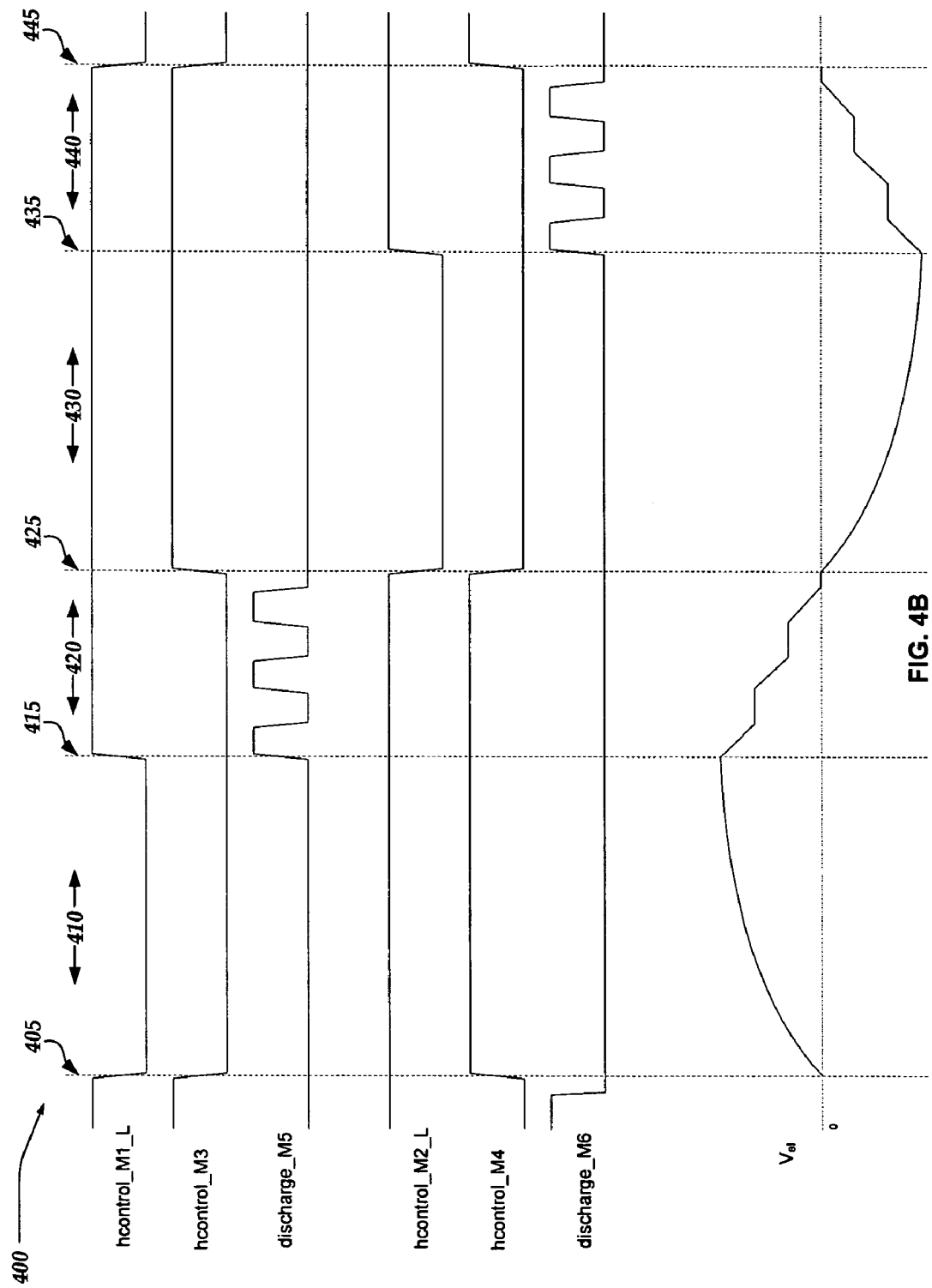
FIG. 4B is a chart that illustrates voltage waveforms showing another set of control voltages and a voltage across an electroluminescent lamp over time in accordance with the invention.

FIG. 3B is a flow chart and FIG. 4B is a timing diagram that show the operation of an inventive process and the resultant signals generated by waveform control circuit 290 in accordance to the embodiment shown in FIG. 2B. FIG. 4B also illustrates voltage waveform $V_{el}$ across EL lamp 240 with respect to time. In particular, block 320, 340/period 420, 440 illustrate the use of multiple discharge pulses to transfer the EL lamp 240 charge back towards the power supply 220.

By discharging EL lamp 240 with multiple discharge pulses, voltage waveform $V_{el}$ more closely resembles a sinusoidal shape. Thus, spurious emissions of electromagnetic energy, and audio noise are reduced. Generally, a greater number of short discharge pulses during a discharge period will result in the shape of waveform $V_{el}$ having closer resemblance to a sinusoid. The number of discharge pulses may be adjusted to reduce the spurious emissions of electromagnetic energy to any acceptable level. Additionally, EL lamp 240 may also be discharged through series regulating resistors and/or the like methods and circuits. Although the foregoing discusses exemplary embodiments of the present invention, those of skill in the art will recognize that various modifications may be made within the scope of the invention. For example, the EL lamp voltage $V_{el}$ may differ from the described modified sinusoidal waveform, various DC/AC circuits and discharge circuits may be suitable employed, and/or the like. Accordingly, the invention is not limited except by the following claims.

What is claimed as new and desired to be protected by Letters Patent of the United States is:

1. A driver circuit for an electroluminescent lamp (EL), comprising:
   a power supply circuit that is configured to increase a provided first DC voltage in a series of stages to a second DC voltage, wherein the second DC voltage is arranged at a predetermined level that is substantially greater than a level of the first DC voltage;
   a converter circuit that is coupled to the power supply circuit and the EL lamp, wherein the converter circuit is arranged to convert the second DC voltage to an AC voltage signal that is operable to illuminate the EL lamp;
   a discharge circuit that is coupled to the EL lamp and the power supply circuit, wherein the discharge circuit is arranged to transfer electrical charge back into the power supply circuit during each discharge cycle of the AC voltage signal, and wherein the transferred electrical charge is reused for each charging cycle of the AC voltage signal that is employed to illuminate the EL lamp; and a logic circuit that is coupled to each of the power supply circuit, converter circuit and discharge circuit, wherein the logic circuit is arranged to at least enable the stages of the power supply circuit to synthesize a relatively sinusoidal waveform during each discharge cycle of the AC voltage signal.

2. The driver circuit of claim 1, wherein the power supply circuit further comprises at least one capacitive element for storing the transferred electrical charge during each discharge cycle of the AC voltage signal, and wherein the at least one capacitive element provides the stored electrical charge for reuse in generating the second DC voltage during each charging cycle of the AC voltage signal.

3. The driver circuit of claim 1, wherein the converter circuit further comprises an H-Bridge arrangement of switching devices for generating the AC voltage signal from the second DC voltage provided by the power supply circuit.

4. The driver circuit of claim 1, wherein the logic circuit employs pulses to sequentially turn off the series of stages in the power supply circuit during each discharge cycle of the AC voltage signal.

5. The driver circuit of claim 1, wherein the synthesized sinusoidal waveform during each discharge cycle of the AC voltage signal is configured to be relatively similar to a sinusoidal waveform of the AC voltage signal during each charging cycle.

6. The driver circuit of claim 1, wherein the synthesized sinusoidal waveform during each discharge cycle of the AC voltage signal is configured to reduce emissions of electromagnetic interference or audio noise.

7. The driver circuit of claim 1, wherein the first DC voltage is provided by a battery.

8. The driver circuit of claim 1, wherein the series of stages in the power supply circuit further comprises at least a plurality of serially connected charge pumps that boost the first DC voltage to the second DC voltage.

9. The driver circuit of claim 8, wherein the boost provided by at least one of the plurality of charge pumps is unregulated, wherein the unregulated boost facilitates adaptation by the power supply circuit to a change in a capacitance of the EL lamp over time.

10. The driver circuit of claim 1, wherein the logic circuit is further arranged to enable selective dimming of the intensity of the illumination of the EL lamp, wherein the intensity of the illumination is based at least in part on a variable frequency of a clock signal.

11. The driver circuit of claim 10, wherein the logic circuit is further arranged to turn off at least a substantial portion of the driver circuit if the selective dimming stops the illumination of the EL lamp.

12. The driver circuit of claim 10, wherein the logic circuit is further arranged to enable a soft start for illuminating the EL lamp, wherein the soft start is based at least in part on the variable frequency of the clock signal.

13. A method for illuminating an electroluminescent lamp, comprising:

increasing a provided first DC voltage to a second DC voltage, wherein the second DC voltage is serially boosted by a plurality of stages to a predetermined level that is substantially greater than a level of the first DC voltage;

converting the second DC voltage to an AC voltage signal that is operable to illuminate the EL lamp; and transferring electrical charge back into a power supply circuit during each discharge cycle of the AC voltage signal and modulating a duty cycle of a discharge signal of over time to synthesize a relatively sinusoidal waveform, wherein the transferred electrical charge is reused for each charging cycle of the AC voltage signal that is employed to illuminate the EL lamp.

14. The method of claim 13, further comprising serially bucking the second DC voltage to the first DC voltage during each discharge cycle of the AC voltage signal, wherein the serial bucking down to the first DC voltage enables the synthesizing of a relatively sinusoidal waveform.

15. The method of claim 13, wherein at least a portion of the serial boost is unregulated, wherein the unregulated boost facilitates adaptation to a change in a capacitance of the EL lamp over time.

16. The method of claim 13, further comprising storing the transferred electrical charge during each discharge cycle of the AC voltage signal, and wherein the at least one capacitive element provides the stored electrical charge for reuse in generating the second DC voltage during each charging cycle of the AC voltage signal.

17. The method of claim 13, further comprising enabling selective dimming of the intensity of the illumination of the EL lamp, wherein the intensity of the illumination is based at least in part on a variable clock signal.

18. The method of claim 17, further comprising turning off at least a substantial portion of a driver circuit if the selective dimming stops the illumination of the EL lamp.

19. The method of claim 18, further comprising enabling a soft start for illuminating the EL lamp, wherein the soft start is based at least in part on the variable clock signal.

20. A processor-readable medium having processor-executable code stored therein, which when executed by one or more processors enables actions, comprising:

increasing a provided first DC voltage to a second DC voltage, wherein the second DC voltage is serially boosted by a plurality of stages to a predetermined level that is substantially greater than a level of the first DC voltage;

converting the second DC voltage to an AC voltage signal that is operable to illuminate the EL lamp; and transferring electrical charge back into a power supply circuit during each discharge cycle of the AC voltage signal and modulating a duty cycle of a discharge signal of over time to synthesize a relatively sinusoidal waveform, wherein the transferred electrical charge is reused for each charging cycle of the AC voltage signal that is employed to illuminate the EL lamp.

21. The processor-readable medium of claim 20 having processor-executable code stored therein, which if executed enables further actions, comprising serially bucking the second DC voltage to the first DC voltage during each discharge cycle of the AC voltage signal, wherein the serial bucking down to the first DC voltage enables the synthesizing of a relatively sinusoidal waveform.

* * * * *